Inventors
Lawrence B. Fendler
William F. Auer

By Wallace, Kinzer and Dorn
Attorneys

United States Patent Office 3,486,048
Patented Dec. 23, 1969

3,486,048
STEPPING MOTOR
Lawrence B. Fendler, Streamwood, and William F. Auer, Des Plaines, Ill., assignors to Comar Electric Company, Chicago, Ill., a corporation of Illinois
Filed Nov. 20, 1967, Ser. No. 684,365
Int. Cl. H02k 33/00, 37/00
U.S. Cl. 310—24                                    3 Claims

ABSTRACT OF THE DISCLOSURE

A stepping motor, characterized by a stepping pawl and a holding detent engageable with a ratchet, derives energy both from a setting and a re-setting standpoint from a pair of electromagnets. When the ratchet is to be re-set after a predetermined number of forward steps, both the stepping pawl and the holding detent are shifted in one action to ineffective positions, and are so interlocked that each holds the other in an ineffective position in a positive fashion assuring complete re-set of the ratchet. The next pulse in the stepping electromagnet both breaks the interlock and is effective to operate the stepping pawl through an effective stroke.

---

This invention relates to a stepping motor, particularly of the kind using an electromagnet such as a solenoid to step the ratchet and a second electromagnet for establishing the necessary movements to permit restoration of the stepping ratchet. Devices of this kind may be employed for numerous functions such as counting, timing, control of circuits and so on, and while a stepping motor of the kind involved by no means represents a new combination, the present construction specifically assures that neither the stepping pawl nor the holding detent will interfere with re-set movement of the ratchet to its start position after the desired count-down or time-out function has been realized.

The primary object of the present invention is to develop this assurance by constructing the stepping pawl and the holding detent so that the two will interlock with each other when there is a demand for re-set, and to realize this interlock in an effective manner by establishing the interlocking through releasable spring tension; further, it is an object of the present invention to accomplish the foregoing while enabling the interlock to be broken, the holding pawl to be restored to its operative position and the stepping pawl moved through an effective stroke upon energization of the stepping electromagnet.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

Figure 1:
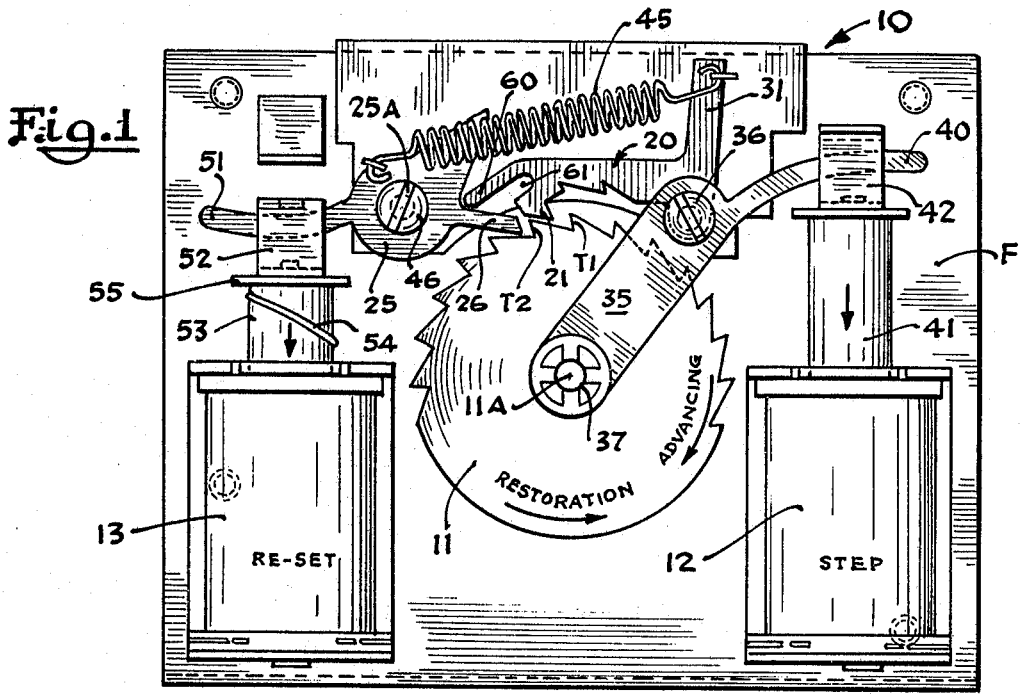
Figure 1A:
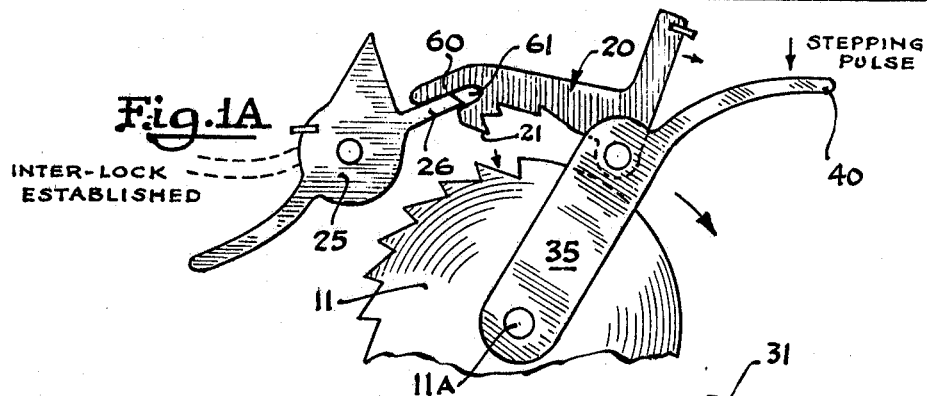
Figures 2, 3:
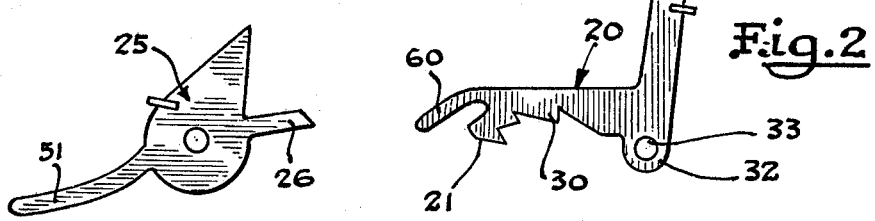

In the drawings:
FIG. 1 is a front elevation of a stepping motor constructed in accordance with the present invention;
FIG. 1A is a partial elevation showing disposition of parts at the time of interlock;
FIG. 2 is a plan view of the stepping pawl; and
FIG. 3 is a plan view of the holding detent.

The stepping motor of the present invention is specifically adapted to control step-by-step advancing motion of a ratchet and the re-setting thereof, the motor as a whole being identified by reference character 10 in FIG. 1. In achieving basic movements of the ratchet wheel 11, resort is had to electromagnetic devices in the form of solenoids 12 and 13 which are arranged as a tandem pair. Solenoid 12 will be referred to as the stepping solenoid and solenoid 13 as the re-set solenoid. All operative parts are supported on a vertical frame F, but the device will operate in almost any position.

The ratchet wheel 11 is located between the two solenoids and is supported for rotation about a horizontal axis 11A. As shown by legend in FIG. 1, the ratchet 11 advances in a clockwise direction, and restoring or return movement thereof to its start position is in the opposite or counterclockwise direction under the restoring force of a torsion spring, not shown. The ratchet 11 may perform any one of many functions: it may be used as a counting device; it may itself be used as a stepping switch in controlling circuits; it may serve as a time-out device, and so on; but in any event, the advancing motion thereof is a step-by-step action as will be explained in detail hereinafter manifest in repeated impulses or energizing cycles of the stepping solenoid 12. On the other hand, when a count-out, time-out or other function of the ratchet 11 has been completed, the ratchet is to be restored to its start position, and this will occur as an incident to a re-set signal delivered to the coil of the re-set solenoid 13.

The ratchet 11, of course, presents teeth as T1 and T2 about the periphery thereof, and in number these teeth will correspond to the extent to which the ratchet will be called upon to store or generate successive counts or the extent to which time or some other function is to be monitored by the ratchet. Step-wise clockwise movement of the ratchet 11 is established by a stepping pawl 20 having a tooth 21 extended to the ratchet 11 in alignment with the tooth of the ratchet which is to be engaged thereby in a forward advancing stroke of the pawl 20. In the instance illustrated, this tooth will be the tooth T1 of the ratchet 11. At the same time, false retrograde movement of the ratchet 11 is prevented by a holding detent 25 which normally presents a holding tooth 26 to the next trailing tooth on the ratchet, the tooth T2 in this instance. The holding detent is under control of the re-set solenoid 13.

The stepping pawl 20, FIG. 2, includes a horizontally projecting arm 30 at the forward end of which is located the stepping tooth 21. The opposite end of the pawl 20 is characterized by a vertically extending lug 31 and a dependent ear 32 having an opening 33 therein. The opening 33 in the pawl 20 represents a pivot point or axis of the pawl 20 on a pawl operating lever 35, FIG. 1, the pawl 20 being supported on the shank of a pin 36 carried by the pawl operating lever 35. In turn, the operating lever 35 is free to pivot or swing on the shank of a pin 37, FIG. 1, coaxial with the axis 11A of the ratchet wheel. The pawl 20 is thus pivotally supported at the upper end of the pawl operating lever 35 and is both confined in place and guided by a thin guide plate fastened to the front face of the frame F so as to overlie the forward face or side of the pawl 20.

The operating lever 35 shifts the pawl in a manner to be described, to step the ratchet 11, and to this end the lever 35, FIG. 1, includes a finger 40 extending in the direction of the stepping solenoid 12. The armature of the stepping solenoid 12 is in the usual form of a plunger or core 41 extending upwardly from within the coil of the solenoid, and the plunger at its upper end is provided with a bracket 42 having a portion overlying the finger 40 on the pawl operating lever 35. When the coil of the solenoid 12 is energized, the plunger 41 is actuated in response to the magnetic field and is pulled downward. Concomitantly, the bracket 42 applies a clockwise moment to the pawl operating lever 35, manifest in clockwise pivotal movement of the lever 35 about the axis 11A. Resultantly, the pawl 20 is urged to the right as viewed in FIG. 1 and the tooth 21 thereof is forced against the tooth T1 of the ratchet 11. The parts are so dimensioned that a stepping impulse thus delivered to the solenoid 12, actuating the plunger 41 through a full stroke, results in one full clockwise step of the ratchet 11. Upon deenergization of the solenoid 12, the plunger 41 thereof is restored by a coil spring hereinafter described which, at the same time, induces return movement of the pawl 20 so that the tooth 21 thereon will be so disposed as to be engageable with the next tooth, T2. During advancement of the ratchet, the tooth 26 of the holding detent skips or indexes across the ratchet teeth.

The spring just referred to is a coil spring 45 having one end anchored to the vertically extending leg 31 of the pawl 20 and the other end anchored to the medial portion of the holding pawl 25, as shown in FIG. 1. The holding pawl 25 is free to pivot on an axis 25A presented by the shank of a pin 46 passed through an opening therein, so that the holding pawl has a fixed axis and is incapable of lateral shifting unlike the stepping pawl 20. Normally the spring 45 is under slight tension, FIG. 1, so that the spring 45 is not only effective to restore the stepping pawl and the plunger 41 of the solenoid 12 as noted, but is also effective to yieldably hold the detent tooth 26 and the stepping tooth 21 in the effective positions shown in FIG. 1. Thus, the spring 45 normally urges the holding pawl 25 clockwise and the stepping pawl 20 counterclockwise.

The holding detent as noted above is under control of the re-set solenoid 13, and to this end the holding detent includes an extension or finger 51 thereon embraced by a bracket 52 secured to the upper end of the plunger 53 of the re-set solenoid 13. Preferably the armature or core 53 of the re-set solenoid 13 is held in a non-actuated or released position shown in FIG. 1 by a spring 54 reacting between the frame of the solenoid 13 and a cap 55 on the plunger 53. A similar spring may be used if desired on the plunger 41 to supplement or aid the action of the coil spring 45.

In accordance with the present invention, the solenoids 12 and 13 are arranged side by side in a neat, tandem package with the ratchet wheel 11 disposed therebetween. Further, the stepping pawl 20 and the holding detent 25 are in the same plane and are substantially co-planar with the plane of the ratchet 11. The axis 25A of the holding pawl, the pivotal axis of the stepping pawl 20 represented by the opening 33, and the axis 11A of the ratchet 11 are parallel, and the spring 45 is multi-functional in nature as mentioned above. The spring 45 serves the additional function of accomplishing an effective interlock between the holding detent and the stepping pawl when a re-set impulse is delivered to the re-set solenoid 13, and this function will now be described.

Experience has shown that a stepping motor of the kind herein involved for stepping a ratchet is capable of malfunctioning in the sense that either the stepping pawl or holding detent sometimes fails to release or restore to a position entirely free of the ratchet, preventing the desired re-setting operation of the ratchet wheel. Furthermore, experience shows that there is sometimes failure of the stepping pawl to step the ratchet in response to the first pulse demanding advancing action of the ratchet, due principally to inability to assure proper restoration of all parts following the re-set pulse; and in those instances where there is an attempt to preclude this possibility, it is usually necessary to resort to an excessive number of operating parts including a plurality of springs. In accordance with the present invention, the stepping pawl and the holding detent are so constructed, in cooperation with the spring 45, as to interlock with each other when the re-set solenoid is energized so that each holds the other in an ineffective position during return movement of the ratchet wheel. Furthermore, this same arrangement of parts is such that the next pulse of the stepping solenoid 12 not only breaks the interlock but also completes the first step of the ratchet 11 in its new cycle of operation.

In achieving these ends, the stepping pawl 20 is provided with a holding finger 60, positioned above the stepping tooth 21, as shown in FIG. 1, and the free end of the holding finger 60 normally bears against the adjacent surface of the holding detent 25 so that the latter also serves as a stop limiting the restored or at-rest position of the pawl 20, as shown in FIG. 1. The holding finger 60 is juxtaposed above the holding tooth 26, and a recess 61 is formed at the end of the stepping pawl 20 immediately between the holding finger 60 and the stepping tooth 21.

When the re-set solenoid 13 is energized, its plunger 53 is pulled downward against spring 54, and the bracket 52 is effective on the finger 51 of the holding pawl 25 to pivot the latter in a counterclockwise direction. Concomitantly, the holding tooth 26 is elevated and eventually engages the holding finger 60 on the pawl 20 whereby the pawl 20 is pivoted clockwise (upwardly) to a position entirely free of the ratchet wheel 11; and of course at this time the holding tooth 26 is also in an elevated position entirely free of the ratchet wheel 11 as shown in FIG. 1B. The holding tooth 26 on the detent 25 is now aligned with the recess 61 in the stepping pawl, and the spring 45 is then effective to cause the walls of the recess 61 to embrace the free end of the holding tooth 26 as shown in FIG. 1B. In this fashion, the holding detent and the stepping pawl are engaged in a positive interlock with both teeth 26 and 21 held entirely free of the ratchet wheel 11 which is restored by the restoring spring (not shown) associated therewith. There can be neither inadvertent release of the holding pawl 25 nor inadvertent release of the stepping pawl 20 so that the ratchet wheel 11 is fully restored to its start position. In fact, the re-set solenoid 13 can be de-energized with the holding detent and the stepping pawl maintained in the position shown in FIG. 1B.

However, when the stepping solenoid is energized with the parts disposed as shown in FIG. 1A, the stepping pawl 20 moves both to the right and downward, breaking the interlock; at the same time, spring 45 presents pawl 20 and the holding detent 25 to the ratchet wheel, and further movement of the operating lever 35, under the influence of the actuated plunger 41, moves pawl 20 through an effective forward stroke, advancing the ratchet by one tooth.

It will be seen from the foregoing that under the present invention the stepping motor embodies relatively few parts with spring 45 serving many different functions. Further, the holding detent 25 when released will itself release and interlock with the stepping pawl in a single swift action. The interlock is maintained by spring 45 under tension, but the next pulse in the stepping solenoid demanding movement of the rachet is both effective to break the interlock and shift the stepping pawl through an effective stroke. The action of the stepping pawl is relatively soft in nature in that it is in position at all times, except interlock, to drive the ratchet wheel, being normally positioned by the spring 45 as shown in FIG. 1. Thus, the action of the stepping pawl is much in the nature of a push rather than a hard strike and hence prolonged life can be expected.

We claim:

1. A stepping motor for stepping a ratchet and comprising a stepping electromagnet and a re-set electromagnet each having a plunger actuatable in response to energization of the coil of the related electromagnet, a ratchet to be stepped in response to actuation of the stepping plunger, a stepping pawl having a stepping tooth engageable with a leading tooth of the ratchet, a pivotal holding detent having a holding tooth normally engageable with a trailing tooth on the ratchet to prevent retrograde movement of the ratchet, a single spring anchored at one end of the stepping pawl and anchored at the other end to the holding detent, said spring acting on the stepping pawl yieldably to present the tooth thereof in operative position to the ratchet, including a pivotally mounted lever means to move the stepping pawl through an operative forward stroke in opposition to the action of said spring to advance the ratchet in response to actuation of the stepping plunger, the stepping pawl being pivotally supported on the lever, said spring returning the stepping pawl to an at-rest position upon de-actuation of the stepping plunger, means to pivot the holding detent in opposition to said spring to a released inoperative position free of the ratchet in response to actuation of the re-set electromagnet to enable the ratchet to be restored in a retrograde movement to its start position, the stepping pawl having a lock-out finger thereon engageable by the tooth on the holding detent, the latter being effective to engage the lock-out finger of the stepping pawl to pivot the stepping pawl about its support on said lever and to hold the stepping pawl in an inoperative position free of the ratchet when the holding pawl is moved to its releasing position upon actuation of the re-set electromagnet, and the stepping pawl having a recess adjacent the lock-out finger thereon in which is interlocked the terminal end of the detent tooth when the holding detent exerts a holding action on the stepping pawl, said spring means being effective to establish said inter-lock.

2. A stepping motor according to claim 1 in which said spring means is a coil spring, the holding detent and the stepping pawl lying substantially in a common plane and each having its pivotal axis in said plane.

3. A stepping motor according to claim 2 in which energization of the stepping electromagnet both releases the inter-lock and moves the stepping pawl through an effective stroke to advance the ratchet.

References Cited

UNITED STATES PATENTS

| | | | |
|---|---|---|---|
| 2,895,340 | 7/1959 | Nicolaus | 335—123 XR |
| 3,242,746 | 3/1966 | Seiden | 74—142 |
| 2,684,579 | 7/1954 | Binks | 74—158 |

MILTON O. HIRSHFIELD, Primary Examiner

B. A. REYNOLDS, Assistant Examiner

U.S. Cl. X.R.

74—142, 158; 335—123